United States Patent [19]

Naessens et al.

[11] Patent Number: 5,880,805
[45] Date of Patent: Mar. 9, 1999

[54] CLICK-ON SPECTACLES HAVING BIFOCAL LENSES

[76] Inventors: Jan Naessens, Bijlokestraat, 10, 9200 Dendermonde; Edwin Thys, Vincent Bavaisstraat, 65, 2540 Hove, both of Belgium

[21] Appl. No.: 785,362

[22] Filed: Jan. 15, 1997

[30] Foreign Application Priority Data

Jan. 17, 1996 [BE] Belgium ................................ 9600041

[51] Int. Cl.⁶ ................................ G02B 7/08; G02B 9/02
[52] U.S. Cl. ................................ 351/57; 351/47; 351/59
[58] Field of Search ................................ 351/44, 47, 57, 351/59, 61, 54, 55

[56] References Cited

U.S. PATENT DOCUMENTS

| | | | |
|---|---|---|---|
| 3,575,497 | 4/1971 | Leblanc | 351/47 |
| 3,957,867 | 5/1976 | Morgan | 351/57 |
| 5,017,001 | 5/1991 | Kooketsu | 351/57 |
| 5,428,407 | 6/1995 | Sheffield | 351/47 |
| 5,710,613 | 1/1998 | Hughes | 351/46 |

*Primary Examiner*—Huy Mai
*Attorney, Agent, or Firm*—William A. Drucker

[57] ABSTRACT

The invention relates to a click-up clip-on spectacles comprising a means for clipping the clip-on spectacles to a spectacle frame and bifocal lenses mounted in the clip-on spectacles. The bifocal lenses consist of two parts mounted one above the other and over the entire width of the spectacle glass, the upper part has a dioptre value of 0 and the lower part has a dioptre value of 1 or more. The upper part of each bifocal spectacle lens has a height of about two thirds of the overall height of the lens and the lower part of each bifocal spectacle lens has a height of roughly one third of the overall height of the spectacle lens. The bifocal lenses may be white or coloured.

4 Claims, 1 Drawing Sheet

CLICK-ON SPECTACLES HAVING BIFOCAL LENSES

BACKGROUND OF THE INVENTION

1. Field of the Invention

The invention is for a pair of click-up clip-on spectacles provided with a means for clipping them to a spectacle frame holding correcting spectacle lenses to improve long sight.

The purpose of the invention is to provide clip-on spectacles which chiefly allow the long-sighted wearer of spectacles to adapt cheaply and simply existing spectacles for long sight or correcting sunglasses to perfect close-up vision in an optically and correct fashion without disturbing the long sight. These clip-on spectacles can be adjusted so that they are suitable for normal eyes with good long sight, for near-sighted or myopic eyes, and for eyes which are already long-sighted or hypermotropic.

2. Brief Description of the Prior Art

Spectacles are known which are provided with bifocal or double view lenses for the long-sighted, in which a segment for the near sight lenses has been included or ground out. Furthermore spectacles are known which are provided with multifocal lenses for both near and long sight in which vision is progressive and the image remains in focus at all distances.

However such spectacles have the disadvantage of being very expensive and requiring regular adjustment. Moreover some people find it difficult to adapt to such spectacles.

Also known are ready-made bifocal spectacles and loupe glasses which have the advantage of being cheap, but which are however rudimentary and are unable to afford proper correction.

Another known solution is to make use of click-up clip-on spectacles which are clipped on to suitable long-sight spectacles and of which the lenses are adapted to correct near-sight over their entire surface.

The disadavantage of this is that the clip-on spectacles must always be removed or clicked up for long vision.

SUMMARY OF THE INVENTION

In order to remedy these disadvantages the chief characteristic of the invention provides for the creation of click-up clip-on spectacles with clips for clipping the clip-on spectacles to a spectacle frame and where the lenses of the clip-on spectacles are provided with bifocal lenses.

As a result accurate and cheap correction for both eyes becomes possible, furthermore no acclimatization by the eyes is required, the clip-on spectacles can be used when new spectacles for long sight are purchased, and the clip-on spectacles can be easily clicked up or removed, which is particularly useful when driving.

BRIEF DESCRIPTION OF THE DRAWINGS

A more detailed but by no means exhaustive description is given by way of example in the following, of one possible embodiment of the clip-on spectacles in accordance with the invention. This description refers to the attached drawing where.

DESCRIPTION OF THE PREFERRED EMBODIMENT

Figure 1:
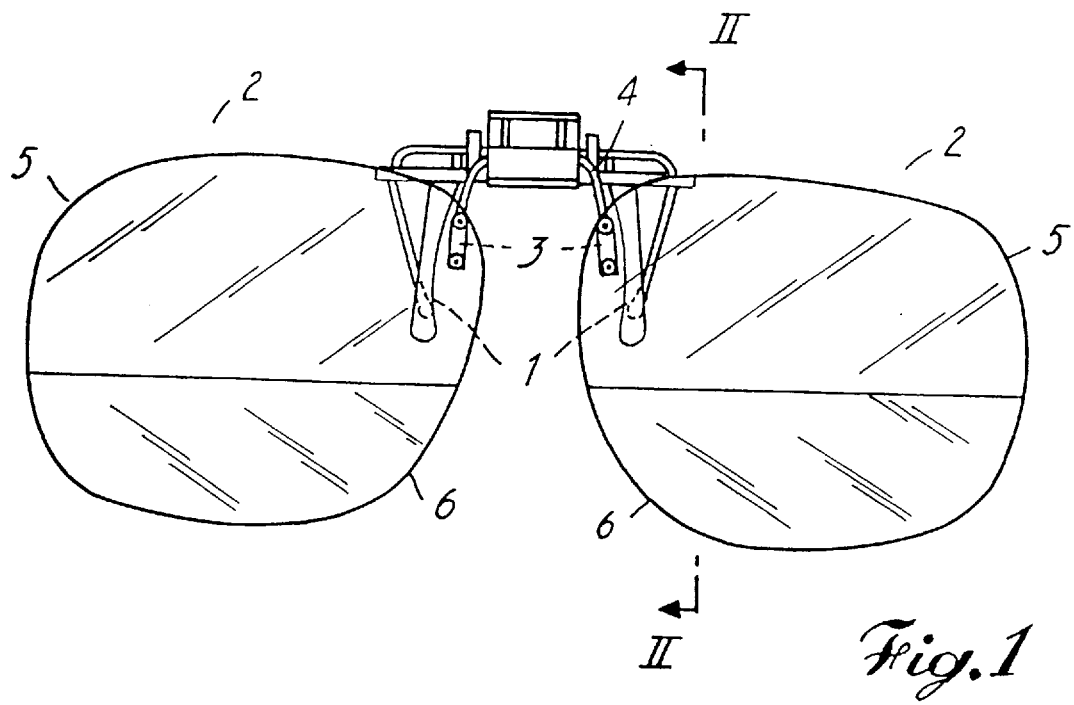
FIG. 1 shows a front view of the click-up clip-on spectacles.
Figure 2:
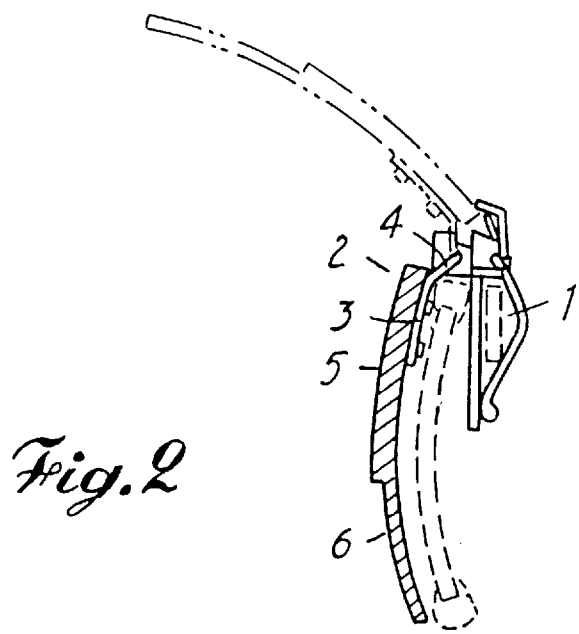
FIG. 2 shows a section through the spectacles along line II—II in FIG. 1

These figures show the clip-on spectacles with clips 1 which serve to clip the clip-on spectacles on spectacles for example for long vision. The bifocal lenses 2 of the clip-on spectacles are held by supports 3 which form part of the piece which pivots in the clips, thus allowing the spectacle lenses to be clicked up as shown by the dotted and dashed lines in FIG. 2 Every bifocal lens contains an upper part 5 of which the heigth is preferably two thirds of the overall height of the lens, and which has a dioptre value of 0 so that long sight is not impeded and a lower part 6 with a height which is preferably one third of the overall height of the lens and which constitutes the correcting part and which has a dioptre value of 1 of more, where both parts extend over the entire width of the lens and each lens is matched to the right and left eyes respectively. This makes perfect long and near sight possible without the acquisition of expensive spectacles.

It goes without saying that the shape, dimensions and power of the lenses as well as the clips of the clip-on spectacles may differ while remaining within the scope of the invention. The bifocal lenses may be white or colored.

claims:

1. Click-up, clip-on spectacles comprising:

(a) bifocal lenses for spectacles for one of distant sight vision correction or sunglasses without dioptric power in the case of early-stage presbyopic users with good distant vision, yet having slight reading problems; and (b) means for retaining said bifocal lenses, said means for retaining including means for clipping said spectacles to a further specatacle frame.

2. Click-up, clip-on spectacles as defined in claim 1, wherein said bifocal lenses include two parts mounted one above the other and over the entire width of said bifocal lenses, the upper part having a diopter value of 0 and the lower part having a diopter value of at least 1.

3. Click-up clip-on spectacles as defined in claim 2, in which the upper part of each bifocal spectacle lens has a height of about two thirds of the overall height of the lens and the lower part of each bifocal spectacle lens has a height of about one third of the overall height of the spectacle lens.

4. Click-up clip-on spectacles as defined in claim 1, in which the bifocal lenses may be colorless or coloured.

* * * * *